US010048994B2

(12) United States Patent
Couture et al.

(10) Patent No.: US 10,048,994 B2
(45) Date of Patent: Aug. 14, 2018

(54) IDENTIFYING FAILED CUSTOMER EXPERIENCE IN DISTRIBUTED COMPUTER SYSTEMS

(71) Applicant: Teachers Insurance and Annuity Association of America, New York, NY (US)

(72) Inventors: Gary Robert Couture, Hollis, NH (US); Mathew Wade Pickering, Port Orange, FL (US); Ethan Luke Michaud, Harrisburg, NC (US); Andrew Eugene Kettering, Westford, MA (US); Scott Matthew Blandford, Hopewell, NJ (US); Rafael Pedro Olaso, Mendon, MA (US); LeeAnn Marie Flanagan, Medway, MA (US); Elizabeth Anne MacDonald, Schenectady, NY (US); William V. Arneth, III, Westborough, MA (US); Ryan Matthew Wiesman, Wausau, WI (US); Troy Christopher Elliott, Edgar, WI (US); Scott James Danesi, Concord, NC (US); Thomas Steven Joyce, Washington, DC (US); Jennifer D'awn Jeffress, Bailey, CO (US); Zachary Franklin Shelton, Stevens Point, WI (US); Eddie Gordon Finch, Jr., Cornelius, NC (US); Matthew M. Bechard, Forestdale, MA (US); Nathaniel J. Bates, Portsmouth, NH (US); Devesh Patel, Waxhaw, NC (US); Jakkinpali Murty, Harrisburg, NC (US); Kristopher C. Krug, Matthews, NC (US); Daniel Joseph Healy, Jr., Dudley, MA (US); Omar C. Saxton, Charlotte, NC (US); Kevin M. McGill, Mansfield, MA (US); Christopher Joseph Heidenfelder, Weston, WI (US); Louis A. Iannucci, Harrisburg, NC (US); Latrisha Devon Whitehead, Charlotte, NC (US)

(73) Assignee: Teachers Insurance and Annuity Association of America, New York, NY (US)

( * ) Notice: Subject to any disclaimer, the term of this patent is extended or adjusted under 35 U.S.C. 154(b) by 68 days.

(21) Appl. No.: 14/518,762

(22) Filed: Oct. 20, 2014

(65) Prior Publication Data
US 2016/0110239 A1     Apr. 21, 2016

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0709* (2013.01); *G06F 11/34* (2013.01); *G06F 17/30* (2013.01); *H04L 67/22* (2013.01)

(58) Field of Classification Search
CPC . G06F 11/0709; G06F 11/102; G06F 11/1024
See application file for complete search history.

(56) References Cited

U.S. PATENT DOCUMENTS 6,473,407 B1 * 10/2002 Ditmer ................ G06F 11/0709
                                                    370/252
9,059,938 B1 *  6/2015 Strand ..................... H04L 67/28
(Continued)

OTHER PUBLICATIONS

CAFC,*Electric Power Group, LLC v. Alstom S.A.*, pp. 1-12 (Year: 2016).*

*Primary Examiner* — Bryce P Bonzo
*Assistant Examiner* — Jonathan D Gibson
(74) *Attorney, Agent, or Firm* — Lowenstein Sandler LLP

(57) ABSTRACT

Systems and methods for identifying failed customer experience in distributed computer systems. An example method may comprise: receiving, by a processing device of a distributed computer system, a first application layer message associated with a request originated by a client computer system responsive to an action by a user, wherein the
(Continued)

first application layer message comprises a transaction identifier identifying a sequence of messages originated by one or more components of the distributed computer system and associated with the request; identifying a pre-defined byte pattern comprised by the first application layer message; and identifying, based on the pre-defined byte pattern, at least one of: a system error associated with the transaction or an application error associated with the transaction.

20 Claims, 7 Drawing Sheets

(51) Int. Cl.
*G06F 17/30* (2006.01)
*G06F 11/34* (2006.01)
*H04L 29/08* (2006.01)

(56) References Cited

U.S. PATENT DOCUMENTS

| | | | | |
|---|---|---|---|---|
| 9,241,014 B2* | 1/2016 | Jayapalan | ............... | H04M 3/42 |
| 2001/0054020 A1* | 12/2001 | Barth | ............... | G06F 17/30867 |
| | | | | 705/37 |
| 2004/0218532 A1* | 11/2004 | Khirman | ............... | H04L 29/06 |
| | | | | 370/235 |
| 2007/0263649 A1* | 11/2007 | Cuni | ............... | H04L 12/2602 |
| | | | | 370/412 |
| 2008/0228617 A1* | 9/2008 | Johnson | ............... | G06Q 40/04 |
| | | | | 705/37 |
| 2008/0275963 A1* | 11/2008 | Hatfield | ............... | G06F 17/30887 |
| | | | | 709/218 |
| 2009/0210427 A1* | 8/2009 | Eidler | ............... | G06F 11/1484 |
| 2010/0145755 A1* | 6/2010 | Narkilahti | ............... | G06Q 10/063 |
| | | | | 705/7.11 |
| 2010/0238820 A1* | 9/2010 | Yokoyama | ............... | G06F 13/4022 |
| | | | | 370/252 |
| 2011/0098973 A1* | 4/2011 | Seidman | ............... | G06F 11/0709 |
| | | | | 702/179 |
| 2013/0046817 A1* | 2/2013 | Isbister | ............... | H04L 69/24 |
| | | | | 709/203 |
| 2013/0125205 A1* | 5/2013 | Hsu | ............... | H04W 12/06 |
| | | | | 726/3 |
| 2013/0232215 A1* | 9/2013 | Gupta | ............... | G06F 3/061 |
| | | | | 709/213 |
| 2013/0311839 A1* | 11/2013 | Brunswig | ............... | G06F 11/0709 |
| | | | | 714/57 |
| 2015/0193720 A1* | 7/2015 | Uthra | ............... | G06Q 10/063112 |
| | | | | 705/7.14 |
| 2016/0034355 A1* | 2/2016 | Sadovsky | ............... | G06F 11/142 |
| | | | | 714/4.3 |

* cited by examiner

302
FUE By user

| | HTTP Error | Perf Error |
|---|---|---|
| Aggregator | | 6 |
| Gomez | 2 | 23 |
| Real User | 43 | 303 |
| Grand Total | 45 | 332 |

304
FUE by Type

| | HTTP Error | Perf Error |
|---|---|---|
| 200 (App Error) | 27 | 332 |
| 404 | 17 | |
| 500 | 1 | |
| Grand Total | 45 | 332 |

306
FUE User impact

| | |
|---|---|
| Distinct Sessions | 157 |
| Distinct Users | 131 |

308
Data by DC

| DATACENTER | |
|---|---|
| prod | 48 |
| prod-a | 113 |
| prod-b | 71 |
| prod-dr | 145 |
| Grand Total | 377 |

309
Data by Server

| DATACENTER | WEBSERVER | |
|---|---|---|
| prod | 10.130.142.133 | 7 |
| | 10.130.142.134 | 6 |
| | 10.136.142.133 | 5 |
| | 10.130.142.135 | 4 |
| prod-a | 10.130.142.228 | 53 |
| | 10.130.142.233 | 21 |
| | 10.130.142.234 | 21 |
| prod-b | 10.136.142.233 | 22 |
| | 10.136.142.234 | 18 |

IDENTIFYING FAILED CUSTOMER EXPERIENCE IN DISTRIBUTED COMPUTER SYSTEMS

TECHNICAL FIELD

The present disclosure is generally related to distributed computer systems, and is more specifically related to application performance management in distributed computer systems.

BACKGROUND

A distributed computer system may comprise one or more components, including, e.g., web servers, application servers, database servers, and/or various other components. A plurality of clients may access the servers of the distributed computer system via a network comprising one or more local area networks and/or one or more wide area networks (e.g., the Internet). Performance and availability of the applications delivered by the distributed computer system may be monitored by an application performance management (APM) system that may collect, store, and process the data reflecting multiple performance and availability parameters of one or more components of the distributed computer system.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3C schematically illustrate examples of failed customer experience (FCE) reporting data presentation graphical user interfaces (GUI) employed by the distributed computer system 1000 of FIG. 1, in accordance with one or more aspects of the present disclosure;

DETAILED DESCRIPTION

Described herein are methods and systems for identifying failed customer experience in distributed computer systems.

In the below description and examples, references are made to Open Systems Interconnection (OSI) model layers, including data link layer (layer 2) and network (layer 3), as defined by Recommendation X.200 (07/94) by International Telecommunications Union (ITU). The data link layer provides local delivery of frames (i.e., units of transmission including a link-layer header followed by a data packet) between devices on the same local area network (LAN). Functions of data link layer protocols include local delivery, addressing, and media arbitration. Examples of data link protocols include Ethernet, Infiniband, or Wi-Fi. The network layer provides the functional and procedural means of transferring variable-length data sequences from a source to a destination host via one or more networks, while maintaining the quality of service functions. Functions of network layer protocols include host addressing and message forwarding.

"Application performance management" herein refers to the monitoring and managing of numerous performance metrics of software applications being executed by distributed computer systems. The application performance metrics may include various metrics related to usage levels of computing resources by a software application, such as the processor usage level, the amount of memory used by the application, and/or the amount of data transferred by the application over the network.

The application performance metrics may further include various end user experience (EUE) metrics, such as the number of requests issued by a client within a given time period, the request processing time (e.g., measured as the page load time), and/or the number of server errors received in response to the client requests. "Failed customer experience" herein refers to a subset of EUE metrics that reflect the impact of various types of errors (including system, application, performance, and service availability errors) upon the end users of a distributed computer system.

In accordance with one or more aspects of the present disclosure, one or more APM components of a distributed computer system may be configured to identify various types of FCE errors by analyzing messages originated and/or received by functional components of the distributed computer system, as described in more details herein below. The distributed computer system may further comprise one or more APM clients configured to represent the FCE data via a graphical user interface (GUI).

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
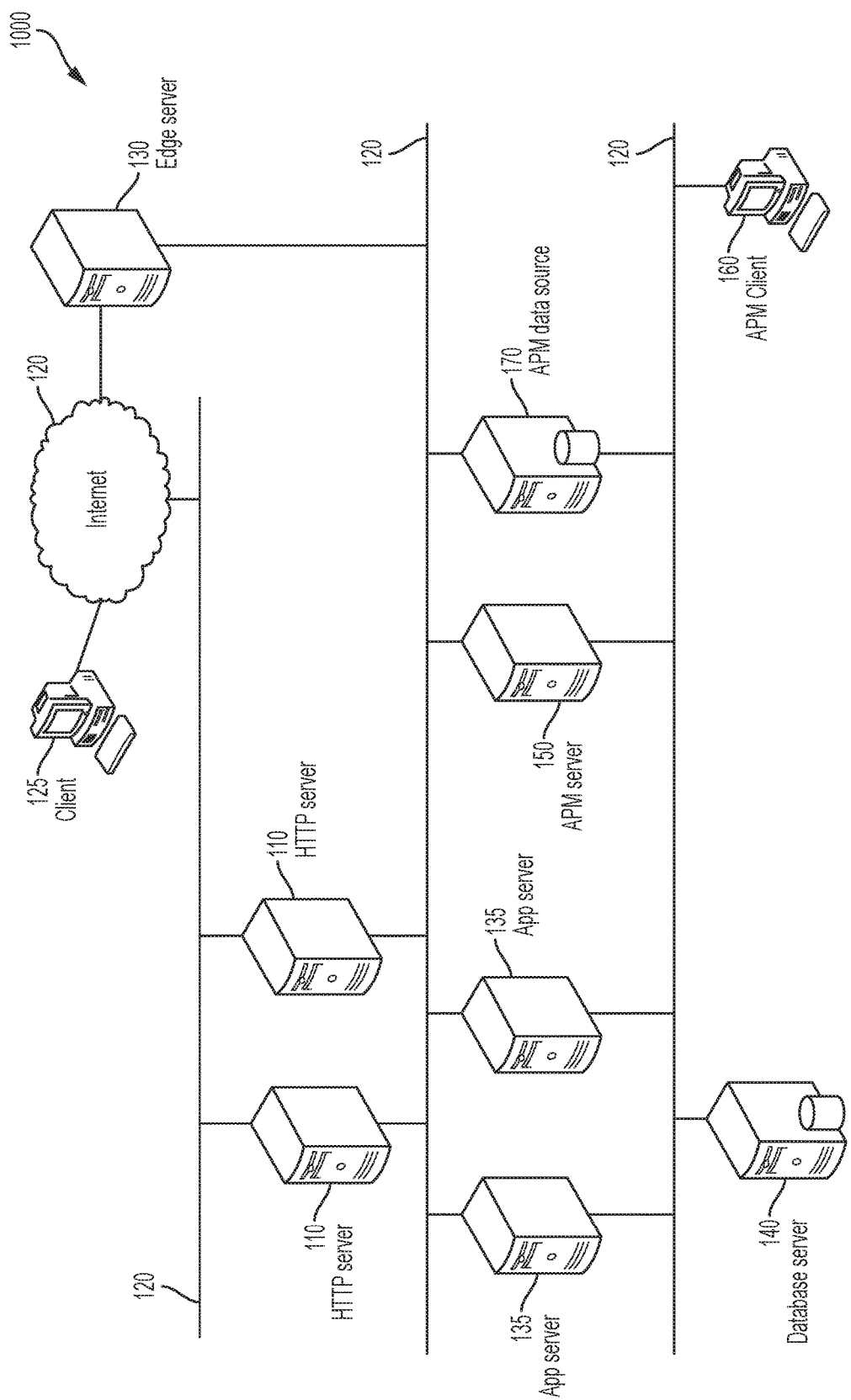
FIG. 1 schematically illustrates a high-level network diagram of an example distributed computer system, in accordance with one or more aspects of the present disclosure.

FIG. 1 schematically illustrates a high-level network diagram of an example distributed computer system 1000, in accordance with one or more aspects of the present disclosure. Firewalls, load balancers, network switches and various other components may be omitted from FIG. 1 for clarity. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems described herein for identifying failed customer experience in distributed computer systems.

In an illustrative example, the distributed computer system 1000 may comprise one or more HTTP servers 110 which may be configured to receive, over one or more networks 120, requests from a plurality of geographically distributed clients 125. Networks 120 may comprise one or more local area networks and/or one or more wide area networks.

In certain implementations, a request initiated by client 125 may initially be routed to edge server 130, which may then select, e.g., based on a load balancing scheme, an HTTP server 110 to which the client request should be routed. In addition to performing the load balancing, edge servers 130 may serve static content in response to client HTTP requests, and/or perform various other tasks.

In an illustrative example, a plurality of edge servers 130 may be geographically distributed so that a request initiated by client 125 would be routed to an edge server 130, which is selected based on the client geographic location and/or other request parameters. Edge server 130 may then forward the client-initiated request to a dynamically selected HTTP server 110. The latter may, upon parsing the request, issue one or more requests to one or more application servers 135. Application server 135 may process a request received from HTTP server 110 and produce a response to be returned to client computer system 125. The request processing by application server 135 may comprise issuing one or more requests to one or more database servers 140. HTTP server 110 may then wrap the response produced by application server 135 into one or more HTTP response messages and return the response messages to client computer system 125 (e.g., via edge server 130).

The above described client request processing serves as an illustrative example only and does not in any way limit the scope of the present disclosure. Various other client request processing components and/or methods may be compatible with the methods and systems for identifying failed customer experience in distributed computer systems.

In certain implementations, the distributed computer system 1000 may further comprise one or more APM components, which may be represented by one or more software modules residing on one or more dedicated monitoring appliances and/or collocated with other functional components of the distributed computer system 1000. In an illustrative example, the APM components may include an APM server 150, an APM client 160, and an APM data source 170. The latter may be provided by file or block-level storage, relational databases, and/or data storage devices or systems of various other types.

In certain implementations, distributed computer system 1000 may further comprise a data visualization subsystem (not shown in FIG. 1) designed to facilitate the visualization of the APM data by APM client 160.

As noted herein above, a presentation, application, or database server of the distributed computer system may be configured, responsive to receiving an incoming application layer message (e.g., a request message) from a client or from another server, to construct and transmit one or more outgoing application layer messages (e.g., one or more response messages) to the request originator and/or forward the incoming application layer message to another server. Distributed computer system 1000 may implement one or more methods for forwarding application layer messages flowing within the system to one or more APM components, including APM server 150 and/or APM data source 170.

In certain implementations, each server may be configured to insert a transaction identifier into the outgoing messages being transmitted by the server, unless such an identifier is already present in the corresponding incoming message. In certain implementations, the transaction identifier may be represented by a globally unique value (GUID). In an illustrative example, the transaction identifier may be represented by a 128-bit GUID, such as {9543EF67-2EC3-FFAD-3BB2-D29A65DB42EF}. In another illustrative example, the transaction identifier may be represented by a combination of a GUID and a server identifier, the latter identifying the server that generated the transaction identifier. In another illustrative example, the transaction identifier may be represented by a combination of a GUID and one or more various other identifiers (e.g., a session identifier, a user identifier, etc.).

In certain implementations, responsive to detecting the outgoing application layer message transmission, an APM agent residing at the server may transmit a logging message to one or more APM components, including APM server 150 and/or APM data source 170. In certain implementations, the logging message transmission may occur over a dedicated connection to the APM data source, in order to enable the real-time APM data collection and subsequent processing.

The logging message may comprise one or more incoming application layer messages and/or one or more outgoing layer messages associated with the same transaction. One or more of the application layer messages may comprise an identifier of the transaction. The term "transaction" herein refers to a sequence of messages flowing between various components of a distributed computer system. Such a sequence may be triggered by a particular user action (e.g., requesting an object identified by a uniform resource identifier (URI) or submitting an HTML form).

Figure 2:
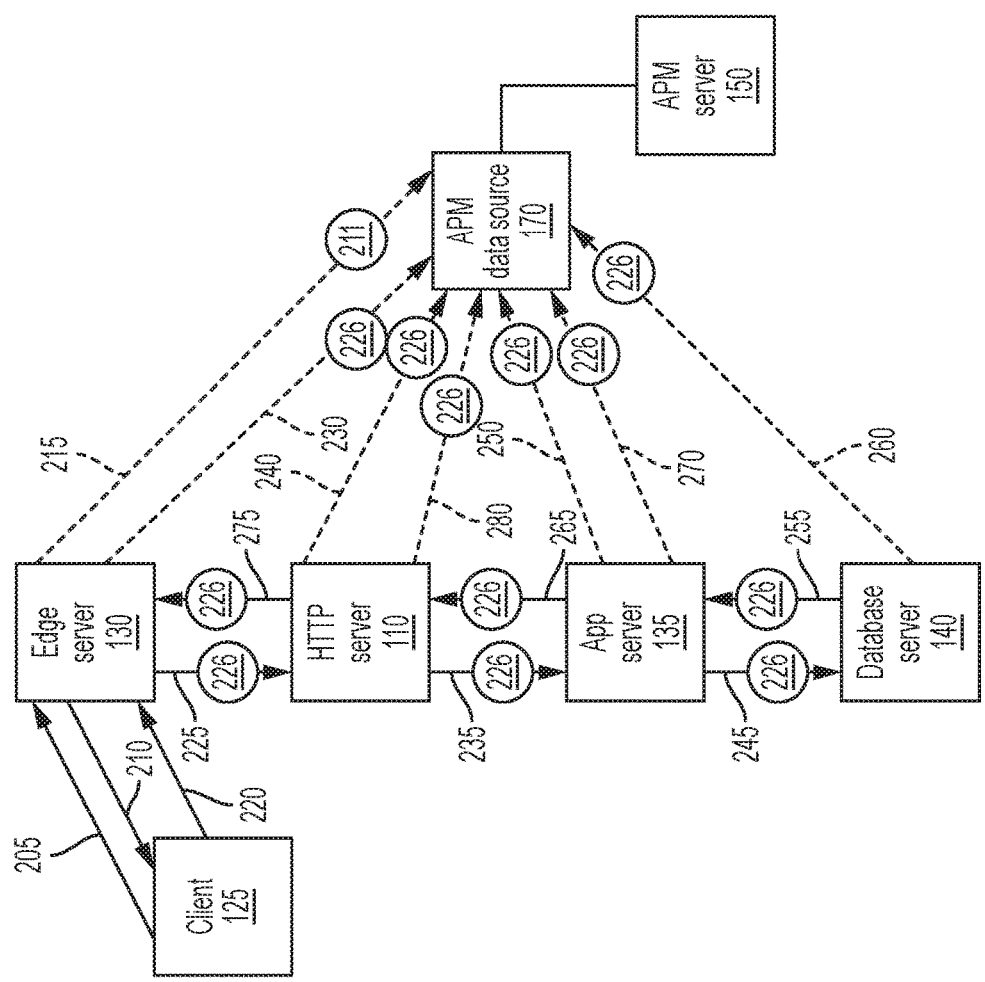
FIG. 2 schematically illustrates examples of request processing by the distributed computer system 1000 of FIG. 1, in accordance with one or more aspects of the present disclosure.

FIG. 2 schematically illustrates examples of request processing by the distributed computer system 1000 of FIG. 1, in accordance with one or more aspects of the present disclosure. In an illustrative example, request 205 initiated by client 125 may initially be routed to an edge server 130, which may be selected based on the client geographic location and/or other request parameters. If the requested content is static and/or cacheable, edge server 130 may transmit response message 210 incorporating the requested content back to requesting client 125. Edge server 130 may also generate new transaction identifier 211 and insert the generated transaction identifier into logging message 215, which edge server 130 may transmit to APM data source 170. Logging message 215 may comprise at least part of response message 210 transmitted by edge server 130 to requesting client 125. Logging message 215 may further comprise transaction identifier 211.

In another illustrative example, request 220 initiated by client 125 may be routed to edge server 130. Responsive to determining that the requested content is not found in the cache, edge server 130 may select, e.g., based on a load balancing scheme, an HTTP server 110 to which the client request should be forwarded. Edge server 130 may build outgoing HTTP request 225 to be transmitted to HTTP server 110, generate new transaction identifier 226, insert the generated transaction identifier into an X-INFO header of outgoing HTTP request 225, and forward outgoing HTTP request 225 to HTTP server 110.

Edge server 130 may further transmit logging message 230 to APM data source 170. Logging message 230 may comprise at least part of outgoing HTTP request 225 transmitted by edge server 130 to HTTP server 110. Logging message 230 may further comprise transaction identifier 226.

HTTP server 110 may, upon parsing incoming message 225, issue one or more requests 235 to one or more application servers 135. Responsive to determining that incoming message 225 comprises transaction identifier 226, HTTP server 110 may insert transaction identifier 226 into X-INFO headers of the one or more outgoing messages 235 associated with incoming message 225, before forwarding the outgoing HTTP request to application server 135.

HTTP server 110 may further transmit logging message 240 to APM data source 170. Logging message 240 may comprise at least part of incoming message 225 and/or at least part of outgoing message 235. Logging message 240 may further comprise transaction identifier 226.

The request processing by application server 135 may comprise issuing one or more requests 245 to one or more database servers 140. Responsive to determining that incoming message 235 comprises transaction identifier 226, application server 135 may insert the transaction identifier into one or more outgoing messages 245 associated with incoming message 235, before forwarding outgoing messages 245 to database server 140.

The application server 135 may further transmit logging message 250 to the APM data source 170. The logging message 250 may comprise at least part of incoming message 235 and/or at least part of outgoing message 245. Logging message 250 may further comprise transaction identifier 226.

Responsive to receiving request 245, database server 140 may produce response message 255 to be transmitted to requesting application server 135. Database server 140 may further transmit logging message 260 to APM data source 170. Logging message 260 may comprise at least part of incoming message 245 and/or at least part of outgoing message 255. Logging message 260 may further comprise transaction identifier 226.

Responsive to receiving database response message 255, application server 135 may build response message 265 to be transmitted to HTTP server 110. Application server 135 may insert transaction identifier 226 into X-INFO header of response message 265, before forwarding response message 265 to HTTP server 110.

Application server 135 may further transmit logging message 270 to APM data source 170. Logging message 270 may comprise at least part of incoming message 255 and/or at least part of outgoing message 265. Logging message 270 may further comprise transaction identifier 226.

HTTP server 110 may then forward response message 275 to edge server 130. HTTP server 110 may further transmit logging message 280 to APM data source 170. Logging message 280 may comprise at least part of incoming message 265 and/or at least part of outgoing message 275. Logging message 280 may further comprise transaction identifier 226.

In certain implementations, in addition to or instead of the above described agent-based monitoring, various other methods may be implemented by distributed computer system 1000 for forwarding application layer messages to one or more APM components, including APM server 150 and/or APM data source 170. In an illustrative example, distributed computer system 1000 may employ one or more data link layer switches and/or network layer routers capable of performing port mirroring. In an illustrative example, data link layer port mirroring may involve sending a copy of network packets seen on one or more switch ports to a network monitoring appliance connected to a certain switch port, which may be connected to APM data source 170 or APM server 150.

APM server 150 may be configured to identify various types of FCE errors by analyzing the application layer messages received from other components of the distributed computer system and/or retrieved from APM data source 170. In certain implementations, APM server 150 may be configured, responsive to determining that an application layer message comprises a pre-defined byte pattern, to identify an error of a certain type that is defined by the byte pattern. In an illustrative example, responsive to detecting the word "error" (case insensitive) within the path string of the URI (URIPath) comprised by the application layer message or within the query string of the URI (URIQueryString), APM server 150 may identify an application error. In another illustrative example, responsive to detecting a status code starting with the character "5" within the HTTP response status string comprised by the application layer message, APM server 150 may identify a system error.

In certain implementations, APM server 150 may be configured to identify a performance error responsive to determining that a time period between two associated application layer messages identified by a common transaction identifier (e.g., a request message and a response message corresponding to the request) exceeds a pre-defined or dynamically configurable threshold (e.g., 30 seconds).

In certain implementations, APM server 150 may be configured to identify a service availability error responsive to failing to receive, within a pre-defined or dynamically configurable period of time, a second application layer message associated with a first application layer message (e.g., by a common transaction identifier). In the illustrative example of FIG. 2, APM server 150 may receive, from APM data source 170, message 230 that has been originated by edge server 130. Logging message 230 may comprise transaction identifier 226 and at least part of outgoing HTTP request 225 transmitted by edge server 130 to HTTP server 110. Responsive to failing to receive, within a pre-defined or dynamically configurable period of time, a logging message originated by HTTP server 110 and comprising transaction identifier 226, APM server 150 may identify a service availability error associated with HTTP server 110. The service availability error may be caused by HTTP server 110 being in a non-operational state and/or being unreachable via one or more networks.

In certain implementations, APM server 150 may comprise a filtering logic configured to prevent false positive error identifications. In an illustrative example, the filtering logic may be configured to prevent false positive error identification with respect to one or more valid URIs comprising the word "error." In an illustrative example, the filtering logic may be configured to prevent false positive error identification with respect to transactions associated with certain user accounts employed by automated testing processes.

In certain implementations, APM server 150 may further comprise a filtering logic configured to prevent multiple error identifications with respect to a common transaction and/or a common user identifier.

Figure 3B:
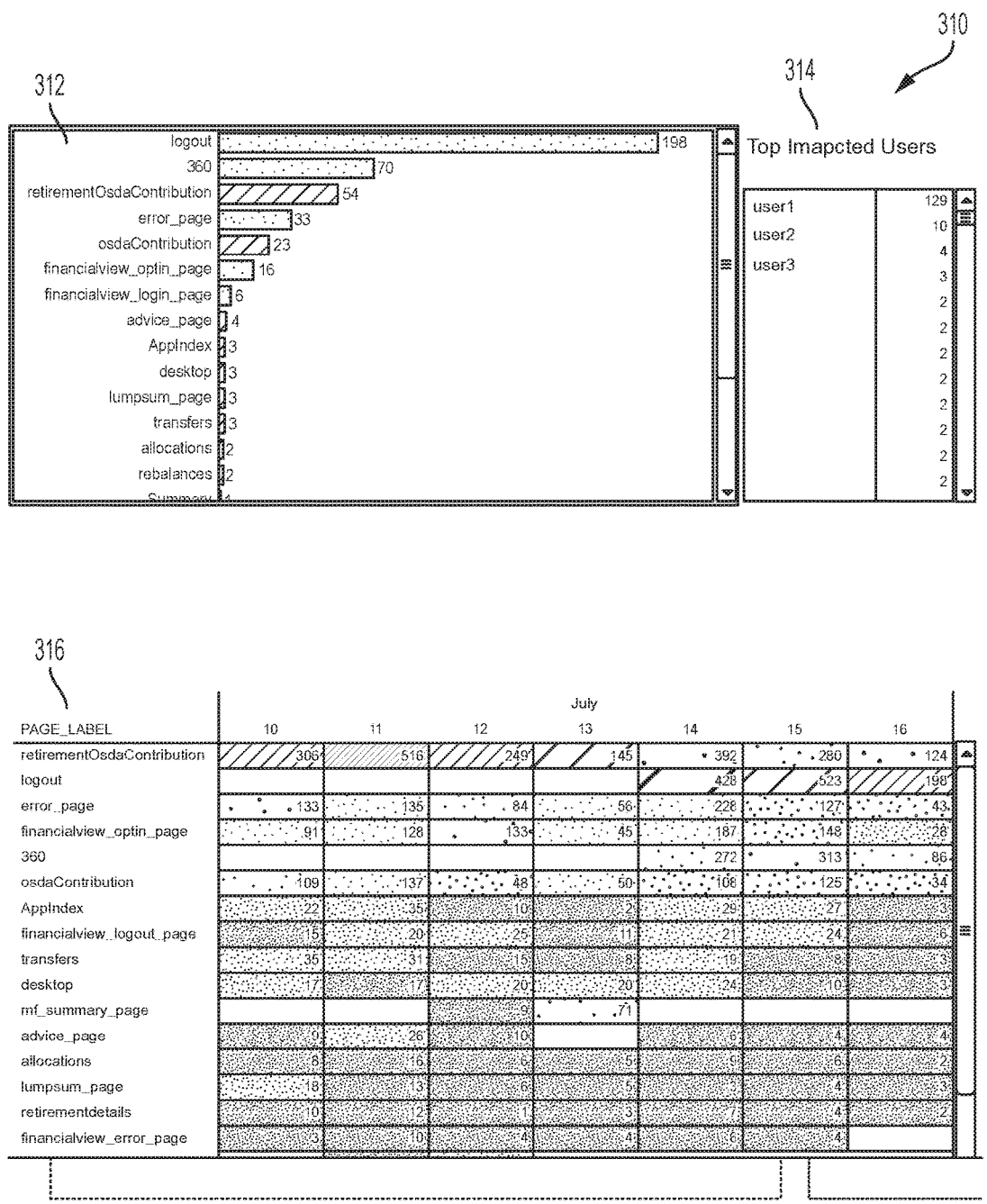
Figure 3C:
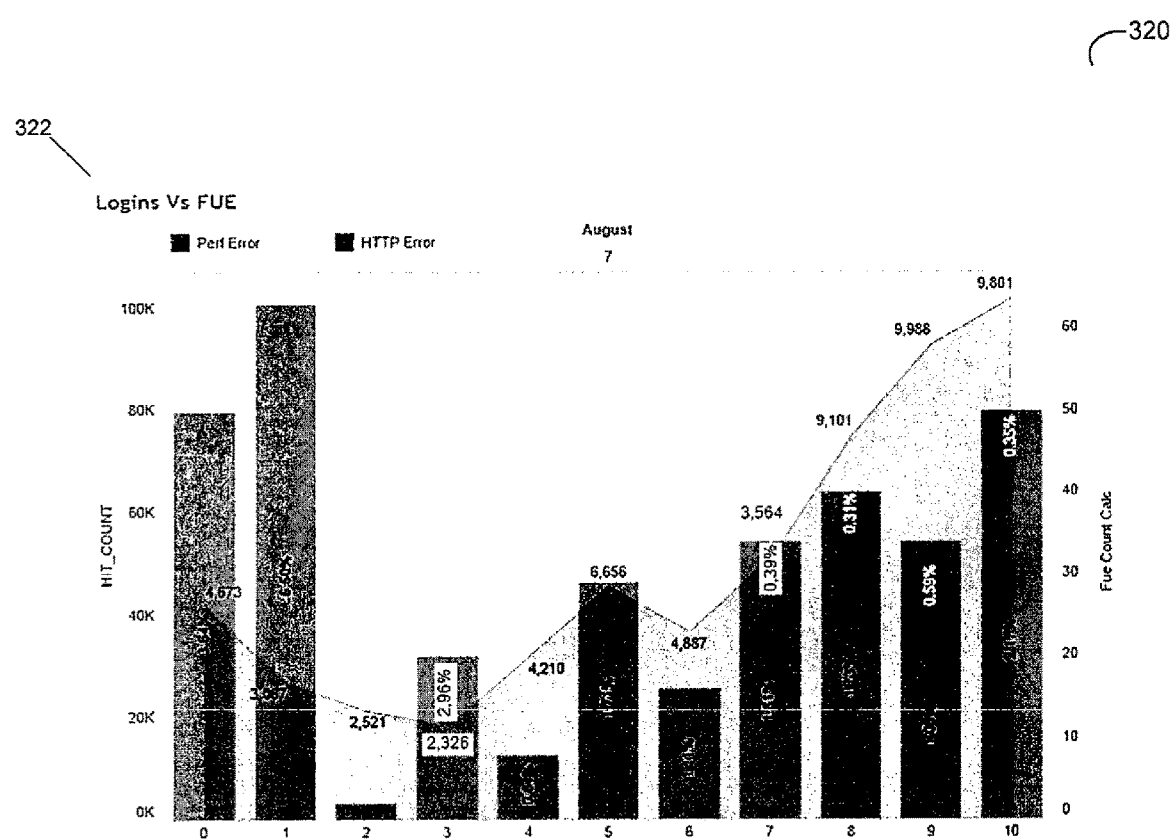

APM server 150 may be configured to correlate each detected error (including system, application, performance, and/or availability errors) with one or more user identifiers of the users affected by the errors. In certain implementations, APM server 150 may be configured to generate FCE reporting data. The FCE reporting data may comprise various tables and graphs representing the detected errors in various associations with users, user sessions, applications, servers, and data centers, as schematically illustrated by FIGS. 3A-3C. APM server 150 may be configured to present, in real-time or near real-time, the generated FCE reporting data via an FCE reporting interface (e.g., using a GUI displayed by APM client 160).

FIG. 3A schematically illustrates an example of FCE reporting data presentation GUI. Reporting data presentation screen 300 comprises a table 302 representing the number of errors of certain error types (including HTTP errors and performance errors) associated with various users. Reporting data presentation screen 300 further comprises a table 304 representing the number of errors of certain error types (including HTTP errors and performance errors) associated with certain error status codes. Reporting data presentation screen 300 further comprises a table 306 representing the number of distinct sessions and distinct users affected by the identified errors. Reporting data presentation screen 300 further comprises a table 308 representing the number of identified errors by data center. Reporting data presentation screen 300 further comprises a table 309 representing the number of identified errors by server.

FIG. 3B schematically illustrates another example of example of FCE reporting data presentation GUI. Reporting data presentation screen 310 comprises frame 312 graphically representing number of identified errors by specific page. Reporting data presentation screen 310 further comprises frame 314 representing a list of affected users, the list comprising the number of detected errors associated with each user. Reporting data presentation screen 310 further comprises frame 316 graphically representing number of errors of certain types associated with certain application pages, by a period of time (e.g., day).

FIG. 3C schematically illustrates another example of example of FCE reporting data presentation GUI. Reporting data presentation screen 320 comprises frame 322 graphically representing number of identified errors of certain types (including HTTP errors and performance errors) and number of logins by a period of time (e.g., day), within a user-configurable date and time period.

The above described application performance monitoring methods and reporting data visualization methods serve as illustrative examples only and do not in any way limit the scope of the present disclosure. Various other APM systems and/or methods may be compatible with the methods and systems for identifying failed customer experience in distributed computer systems described herein.

Figure 4:
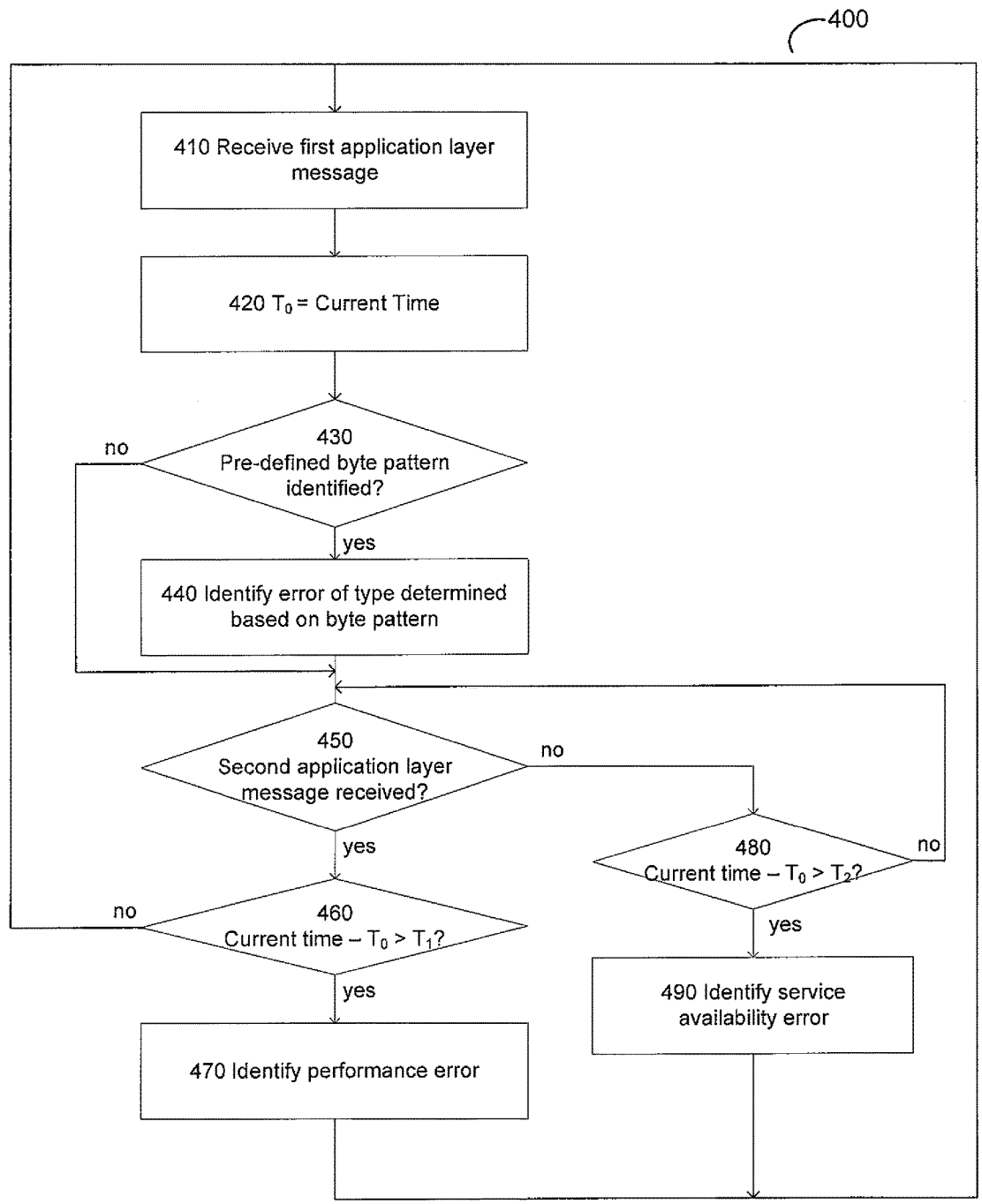
FIG. 4 depicts a flow diagram of an example method for identifying failed customer experience in distributed computer systems, in accordance with one or more aspects of the present disclosure.

FIG. 4 depicts a flow diagram of an example method 400 for identifying failed customer experience in distributed computer systems, in accordance with one or more aspects of the present disclosure. Method 400 and/or each of its individual functions, routines, subroutines, or operations may be performed by one or more general purpose and/or specialized processing devices. Two or more functions, routines, subroutines, or operations of method 400 may be performed in parallel or in an order that may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, method 400 may be performed by an example computer system 500 described herein below with references to FIG. 5.

Referring to FIG. 4, at block 410, the processing device implementing the method may receive a first application layer message associated with a request originated by a client computer system responsive to an action by a user. In certain implementations, the application layer message may be wrapped within a logging message, as described in more details herein above. The application layer message may comprise a transaction identifier identifying a sequence of messages originated by one or more components of the distributed computer system and associated with the request.

In certain implementations, the application layer message may be retrieved from an APM data source comprising a file-level storage, a block-level storage, or a relational database.

In various illustrative examples, the application layer message may be originated by an application performance management (APM) agent running on a component of the distributed computer system, such as an edge server, an HTTP server, an application server, or a database server. Alternatively, the application layer message may be originated by a port mirroring device.

In an illustrative example, the application layer message may comprise an HTTP request or an HTTP response. The application layer message may further comprise a universal resource identifier (URI) including a path comprising the pre-defined byte pattern and/or a query string comprising the pre-defined byte pattern. The byte pattern comprises a pre-defined HTTP status code, as described in more details herein above.

At block 420, the processing device may initialize a variable $T_0$ with the value of the current time, for later validating certain timeouts, as described in more details herein below.

Responsive to identifying, at block 430, a pre-defined byte pattern within the first application layer message, the processing device may, at block 440, identify an error of a certain type (e.g., a system error or an application error) associated with the transaction. The type of error may be determined based on the identified byte pattern, as described in more details herein above.

Responsive to ascertaining, at block 450, that a second application layer message comprising the transaction identifier and a response to the request comprised by the first application layer message has been received, the processing may continue at block 460; otherwise, the method may branch to block 480.

Responsive to determining, at block 460, that the time period between the response and the request exceeds a certain threshold value $T_1$ (i.e., the difference between the current time and the value of $T_0$ variable exceeds the value of $T_1$), the processing device may, at block 470, identify a performance error; the method may then loop back to block 410.

Responsive to determining, at block 480, that a timeout exceeding a certain threshold value $T_2$ has expired since the time of receiving the first application layer message (i.e., the difference between the current time and the value of $T_0$ variable exceeds the value of $T_2$), the processing device may, at block 490 identify a service unavailability error; the method may then loop back to block 410.

Figure 5:
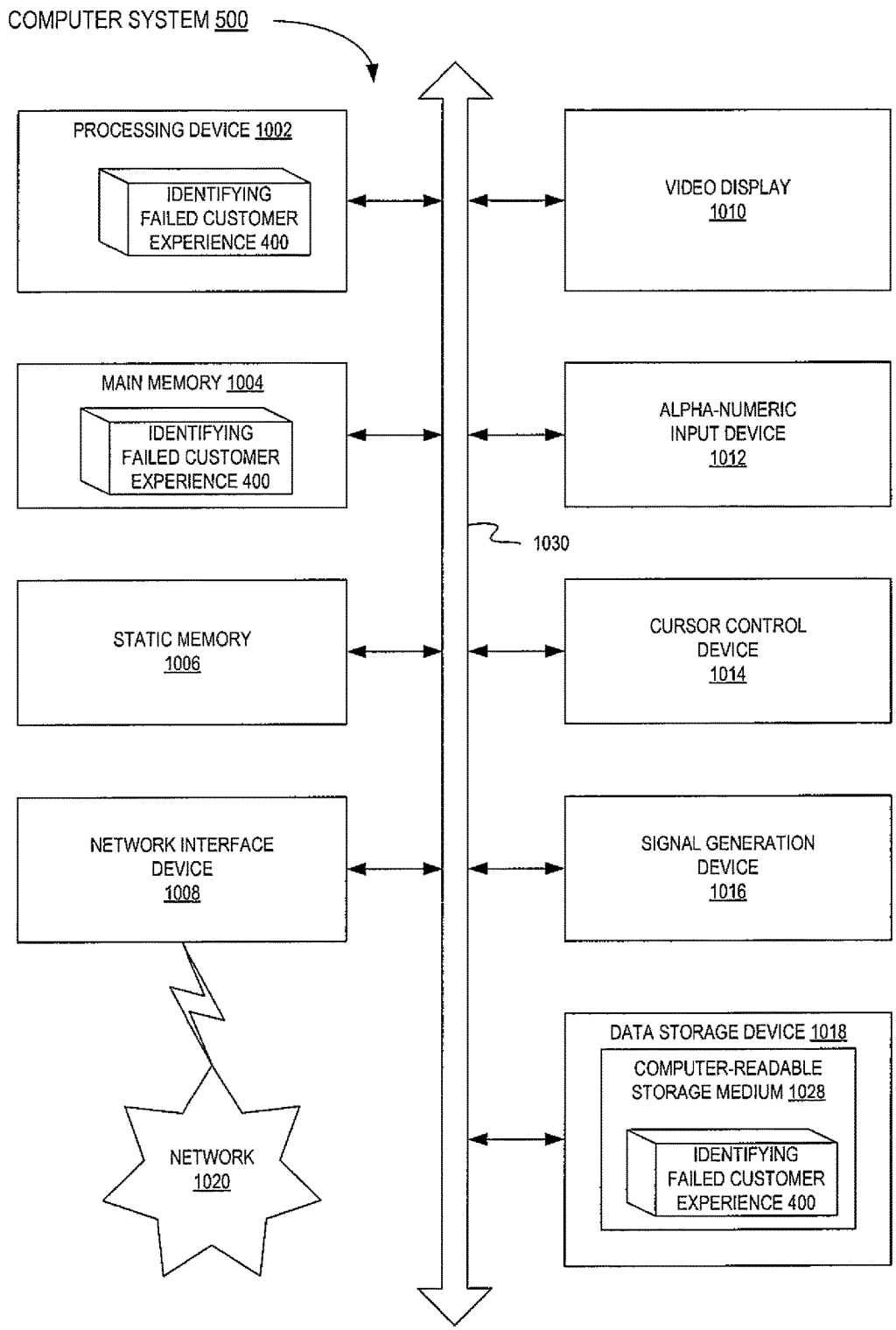
FIG. 5 depicts a block diagram of an illustrative computing device operating in accordance with one or more aspects of the present disclosure.

FIG. 5 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 400 for identifying failed customer experience in distributed computer systems.

The example computer system 500 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the method 400 for identifying failed customer experience in distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 400 for identifying failed customer experience in distributed computer systems, in accordance with one or more aspects of the present disclosure) implementing any one or more of the methods or functions described herein. Instructions implementing the method 400 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by an application performance management (APM) server associated with a distributed computer system, a first application layer message associated with a request originated by a client computer system responsive to an action by a user;
    receiving a second application layer message comprising a response to the first application layer message, wherein the first application layer message and the second application layer message are identified by a common transaction identifier identifying a sequence of messages originated by one or more components of the distributed computer system and associated with the request;
    responsive to determining that a time period between the second application layer message and the first application layer message exceeds a certain threshold value, identifying a failed customer experience error; and
    causing a first graph to be rendered by a graphical user interface in a visual association with a second graph representing a number of user login events grouped by a pre-defined period of time, wherein the first graph represents a number of identified failed customer experience errors grouped by the pre-defined period of time.

2. The method of claim 1, wherein the first application layer message is received from an application performance management (APM) agent running on a computer system comprised by the distributed computer system, the computer system represented by one of: an edge server, an HTTP server, an application server, or a database server.

3. The method of claim 1, wherein the first application layer message is received from a port mirroring device.

4. The method of claim 1, wherein receiving the first application layer message comprises retrieving the first application layer message from the APM data source comprising at least one of: a file-level storage, a block-level storage, and a relational database.

5. The method of claim 1, wherein the first application layer message comprises one of: an HTTP request or an HTTP response.

6. The method of claim 1, further comprising:
responsive to failing to receive, within a certain period of time, a third application layer message comprising the common transaction identifier, identifying a service unavailability error.

7. The method of claim 1, further comprising:
causing reporting data to be presented via a graphical user interface, the reporting data comprising a description of an identified error and one or more user identifiers affected by the identified error.

8. The method of claim 7, wherein the reporting data comprises a number of users affected by identified failed customer experience errors of a certain type.

9. The method of claim 1, wherein the transaction identifier comprises an identifier of a server that generated the transaction identifier.

10. The method of claim 1, further comprising:
identifying a pre-defined byte pattern comprised by the first application layer message; and
identifying, based on the pre-defined byte pattern, a second failed customer experience error associated with the transaction.

11. The method of claim 10, further comprising:
preventing false positive error identification with respect to a Universal Resource Identifier comprising a valid byte pattern.

12. The method of claim 1, further comprising:
preventing false positive error identification with respect to a transaction associated with a user account employed by an automated testing process.

13. A distributed computer system comprising:
an application performance management (APM) data source; and
an APM server comprising a memory; and a processing device, coupled to the memory, wherein the processing device is configured to:
receive, from the APM data source, a first application layer message associated with a request originated by a client computer system responsive to an action by a user
receive a second application layer message comprising a response to the first application layer message, wherein the first application layer message and the second application layer message are identified by a common transaction identifier identifying a sequence of messages originated by one or more components of the distributed computer system and associated with the request;
responsive to determining that a time period between the second application layer message and the first application layer message exceeds a certain threshold value, identify a failed customer experience error; and
cause a first graph to be rendered by a graphical user interface in a visual association with a second graph representing a number of user login events grouped by a pre-defined period of time, wherein the first graph represents a number of identified failed customer experience errors grouped by the pre-defined period of time.

14. The distributed computer system of claim 13, wherein the processing device is further configured to:
responsive to failing to receive, within a certain period of time, a third application layer message comprising the common transaction identifier, identify a service unavailability error.

15. The distributed computer system of claim 13, wherein the transaction identifier comprises an identifier of a server that generated the transaction identifier.

16. The distributed computer system of claim 13, wherein the processing device is further configured to:
identify a pre-defined byte pattern comprised by the first application layer message; and
identify, based on the pre-defined byte pattern, a second failed customer experience error associated with the transaction.

17. The distributed computer system of claim 13, wherein the processing device is further configured to:
prevent false positive error identification with respect to a transaction associated with a user account employed by an automated testing process.

18. The distributed computer system of claim 13, wherein the reporting data comprises a number of users affected by identified failed customer experience errors of a certain type.

19. A computer-readable non-transitory storage medium comprising executable instructions that, when executed by a processor of an application performance management (APM) server associated with a distributed computer system, cause the processor to perform operations comprising:
receiving a first application layer message associated with a request originated by a client computer system responsive to an action by a user;
receiving a second application layer message comprising a response to the first application layer message, wherein the first application layer message and the second application layer message are identified by a common transaction identifier identifying a sequence of messages originated by one or more components of the distributed computer system and associated with the request;
responsive to determining that a time period between the second application layer message and the first application layer message exceeds a certain threshold value, identifying a failed customer experience error; and
causing a first graph to be rendered by a graphical user interface in a visual association with a second graph representing a number of user login events grouped by a pre-defined period of time, wherein the first graph represents a number of identified failed customer experience errors grouped by the pre-defined period of time.

20. The computer-readable non-transitory storage medium of claim 19, further comprising executable instructions causing the computer system to perform operations comprising:
causing reporting data be presented via a graphical user interface, the reporting data comprising a description of an identified error and one or more user identifiers affected by the identified error.

* * * * *